US008813373B2

(12) United States Patent
Scott

(10) Patent No.: US 8,813,373 B2
(45) Date of Patent: Aug. 26, 2014

(54) BLADE CLAMP MECHANISM

(75) Inventor: John S. Scott, Brookfield, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 1399 days.

(21) Appl. No.: 12/209,924

(22) Filed: Sep. 12, 2008

(65) Prior Publication Data

US 2009/0072500 A1    Mar. 19, 2009

Related U.S. Application Data

(60) Provisional application No. 60/972,457, filed on Sep. 14, 2007.

(51) Int. Cl.
*B23Q 15/00* (2006.01)
(52) U.S. Cl.
USPC .................................. 30/339; 30/337; 30/392
(58) Field of Classification Search
USPC ............... 30/339, 337, 392; 83/180; 403/324, 403/322.2; 279/75
See application file for complete search history.

(56) References Cited

U.S. PATENT DOCUMENTS

| | | |
|---|---|---|
| 2,411,028 A | 11/1946 | Davies et al. |
| 3,024,032 A | 3/1962 | Nixon |
| 3,398,965 A | 8/1968 | Cox |
| 3,583,716 A | 6/1971 | Daniel, Jr. |
| 3,750,283 A | 8/1973 | Hoffman |
| 3,754,330 A | 8/1973 | Anderson et al. |
| 3,823,473 A | 7/1974 | Hoffman |
| 3,927,893 A | 12/1975 | Dillon et al. |
| 3,964,163 A | 6/1976 | Russo |
| 4,020,555 A | 5/1977 | Hedrick |
| 4,083,112 A | 4/1978 | Palm |
| 4,106,181 A | 8/1978 | Mattchen |

(Continued)

FOREIGN PATENT DOCUMENTS

| | | |
|---|---|---|
| DE | 3713208 | 11/1988 |
| DE | 4138986 | 6/1993 |

(Continued)

OTHER PUBLICATIONS

DeWalt Reciprocating Saw, (See Exhibit A) in public use prior to Sep. 12, 2007.

(Continued)

*Primary Examiner* — Omar Flores Sanchez
(74) *Attorney, Agent, or Firm* — Michael Best & Friedrich LLP

(57) ABSTRACT

A cutting tool clamp mechanism for a power tool includes a housing supported by a spindle, the spindle being configured to receive and drive a cutting tool along a longitudinal axis of the spindle. A clamping system is supported by the housing and includes an engaging portion movable relative to the spindle, the clamping system having an engaged condition, in which the engaging portion is engageable with the cutting tool to secure the cutting tool in the spindle, and a released condition, in which the engaging portion is disengageable with the cutting tool. A biasing member is positioned between the housing and the clamping system, and operable to bias the clamping system to the engaged condition. When the cutting tool is removed from the spindle, the clamping system is held in the released condition, and upon insertion of the cutting tool into the housing, the clamping system moves from the released condition to the engaged condition.

29 Claims, 8 Drawing Sheets

(56) References Cited

U.S. PATENT DOCUMENTS

| | | | |
|---|---|---|---|
| 4,204,692 A | 5/1980 | Hoffman | |
| 4,243,342 A | 1/1981 | Marto | |
| 4,285,129 A | 8/1981 | Hoffman | |
| 4,294,013 A | 10/1981 | Krieg | |
| 4,299,402 A | 11/1981 | Hoffman | |
| 4,351,112 A | 9/1982 | Nalley | |
| 4,441,255 A | 4/1984 | Hoffman | |
| 4,470,196 A | 9/1984 | Hoffman | |
| 4,528,753 A | 7/1985 | Kuhlmann et al. | |
| 4,550,500 A | 11/1985 | Kuhlmann et al. | |
| 4,601,477 A | 7/1986 | Barrett et al. | |
| 4,628,605 A | 12/1986 | Clowers | |
| 4,648,182 A | 3/1987 | Hoffman | |
| 4,813,829 A | 3/1989 | Koppelmann | |
| 4,864,727 A | 9/1989 | Chu | |
| 5,000,614 A | 3/1991 | Walker et al. | |
| 5,058,280 A | 10/1991 | Pollak et al. | |
| 5,103,565 A | 4/1992 | Holzer, Jr. | |
| 5,122,007 A | 6/1992 | Smith | |
| 5,165,173 A | 11/1992 | Miller | |
| 5,222,956 A * | 6/1993 | Waldron | 606/80 |
| 5,233,892 A | 8/1993 | Roberts | |
| 5,272,948 A | 12/1993 | Theising | |
| 5,306,025 A | 4/1994 | Langhoff | |
| 5,322,302 A | 6/1994 | Quirijnen | |
| 5,324,052 A | 6/1994 | Ortmann | |
| 5,340,129 A | 8/1994 | Wright | |
| 5,351,590 A | 10/1994 | Everts et al. | |
| 5,363,733 A | 11/1994 | Baird et al. | |
| 5,402,580 A | 4/1995 | Seto et al. | |
| 5,421,232 A | 6/1995 | Laverick | |
| 5,433,008 A | 7/1995 | Barger et al. | |
| 5,433,457 A | 7/1995 | Wright | |
| 5,439,472 A | 8/1995 | Evans et al. | |
| 5,443,276 A | 8/1995 | Nasser et al. | |
| 5,458,346 A * | 10/1995 | Briggs | 279/97 |
| 5,487,221 A | 1/1996 | Oda et al. | |
| 5,573,255 A | 11/1996 | Salpaka | |
| 5,575,071 A | 11/1996 | Phillips et al. | |
| 5,647,133 A | 7/1997 | Dassoulas | |
| 5,697,279 A | 12/1997 | Schnizler et al. | |
| 5,722,309 A | 3/1998 | Seyerle | |
| 5,724,742 A | 3/1998 | Grabowski | |
| 5,794,352 A | 8/1998 | Dassoulas | |
| 5,848,474 A | 12/1998 | Fortney et al. | |
| 5,903,983 A | 5/1999 | Jungmann et al. | |
| 5,934,846 A | 8/1999 | Ishii | |
| 5,946,810 A | 9/1999 | Hoelderlin et al. | |
| 5,954,347 A | 9/1999 | Buck et al. | |
| 5,971,403 A | 10/1999 | Yahagi et al. | |
| 5,984,596 A | 11/1999 | Fehrle et al. | |
| 5,989,257 A | 11/1999 | Tidwell et al. | |
| 5,996,452 A | 12/1999 | Chiang | |
| 6,009,627 A | 1/2000 | Dassoulas et al. | |
| 6,023,848 A | 2/2000 | Dassoulas et al. | |
| 6,112,420 A | 9/2000 | Schickerling | |
| 6,178,646 B1 | 1/2001 | Schnell et al. | |
| 6,209,208 B1 | 4/2001 | Marinkovich et al. | |
| 6,233,833 B1 | 5/2001 | Grant et al. | |
| 6,237,231 B1 | 5/2001 | Jungmann et al. | |
| 6,260,281 B1 | 7/2001 | Okumura et al. | |
| 6,276,065 B1 | 8/2001 | Osada et al. | |
| 6,295,736 B1 | 10/2001 | Dassoulas et al. | |
| 6,502,317 B2 | 1/2003 | Dassoulas et al. | |
| 6,612,039 B2 | 9/2003 | Kakiuchi et al. | |
| 6,638,290 B2 | 10/2003 | Pascaloff et al. | |
| 6,725,548 B1 | 4/2004 | Kramer et al. | |
| 6,735,876 B2 | 5/2004 | Hirabayashi | |
| 6,810,782 B2 | 11/2004 | Wuensch et al. | |
| 6,848,186 B1 | 2/2005 | Chen et al. | |
| 6,851,194 B1 | 2/2005 | Chen et al. | |
| 6,854,187 B2 | 2/2005 | Huan | |
| 6,877,751 B2 | 4/2005 | Hsing | |
| 6,893,026 B2 | 5/2005 | Yoshimura et al. | |
| 6,944,959 B2 | 9/2005 | Bigden et al. | |
| 7,003,888 B2 | 2/2006 | Bigden et al. | |
| 7,040,023 B2 | 5/2006 | Nemazi et al. | |
| 7,107,690 B2 | 9/2006 | Lui et al. | |
| 7,111,405 B2 | 9/2006 | Delfini et al. | |
| 7,210,232 B2 | 5/2007 | Guo | |
| 7,251,897 B2 | 8/2007 | Shuhua | |
| 7,257,900 B2 | 8/2007 | Wheeler et al. | |
| 7,325,315 B2 | 2/2008 | Bigden et al. | |
| 7,441,338 B2 | 10/2008 | Delfini et al. | |
| 7,871,080 B2 | 1/2011 | Marini et al. | |
| 8,117,757 B2 | 2/2012 | Kuo | |
| 8,272,135 B2 | 9/2012 | Zhou | |
| 2003/0150120 A1 | 8/2003 | Hartmann et al. | |
| 2004/0035010 A1 | 2/2004 | Kakiuchi et al. | |
| 2004/0194324 A1 | 10/2004 | Youn-Chyuan | |
| 2005/0093252 A1 | 5/2005 | Park | |
| 2005/0120568 A1 | 6/2005 | Wilson | |
| 2005/0132584 A1 | 6/2005 | Cornwell et al. | |
| 2005/0144791 A1 | 7/2005 | Ritter et al. | |
| 2006/0053639 A1 | 3/2006 | Nakanishi | |
| 2006/0096103 A1 | 5/2006 | Roberts | |
| 2006/0174495 A1 | 8/2006 | Jumior | |
| 2007/0101587 A1 | 5/2007 | Bone | |
| 2007/0131075 A1 | 6/2007 | Zhang et al. | |
| 2007/0131076 A1 | 6/2007 | Yasheng | |
| 2007/0151112 A1 | 7/2007 | Rakaczki | |
| 2007/0163415 A1 | 7/2007 | Ritter et al. | |

FOREIGN PATENT DOCUMENTS

| | | |
|---|---|---|
| DE | 9305188 | 6/1993 |
| DE | 4311161 | 10/1994 |
| EP | 0544129 | 6/1993 |
| EP | 0582326 | 2/1994 |
| EP | 0623413 | 11/1994 |
| EP | 0833459 | 4/1998 |
| EP | 1529586 A1 | 5/2005 |
| ES | 2069364 | 5/1995 |
| GB | 772079 | 8/1954 |
| GB | 2192363 A | 1/1988 |
| GB | 2296888 | 7/1996 |
| GB | 2342314 | 4/2000 |
| JP | 2001179534 A | 7/2001 |
| JP | 2003117723 A | 4/2003 |
| WO | 8908524 | 9/1989 |
| WO | 9527583 | 10/1995 |
| WO | 9731745 | 9/1997 |

OTHER PUBLICATIONS

Metabo Reciprocating Saw, (See Exhibit B) in public use prior to Sep. 12, 2007.
Ridgid Reciprocating Saw, (See Exhibit C) in public use prior to Sep. 12, 2007.
Hitachi Reciprocating Saw, (See Exhibit D) in public use prior to Sep. 12, 2007.
Makita Reciprocating Saw, (See Exhibit E) in public use prior to Sep. 12, 2007.
Bosch Reciprocating Saw, (See Exhibit F) in public use prior to Sep. 12, 2007.
Search Report of GB0816750.4, dated Jan. 29, 2009.
U.S. Appl. No. 12/209,916, dated Mar. 29, 2011 (8 pages).
Office Action from the United States Patent and Trademark Office for U.S. Appl. No. 12/209,916 dated Jan. 9, 2013 (9 pages).

* cited by examiner

US 8,813,373 B2

BLADE CLAMP MECHANISM

CROSS-REFERENCE TO RELATED APPLICATION(S)

This application claims priority to U.S. Provisional Patent Application No. 60/972,457, entitled "BLADE CLAMP MECHANISM", filed Sep. 14, 2007 by John S. Scott, the entire contents of which is hereby incorporated by reference.

BACKGROUND

The present invention relates to reciprocating saws and more specifically to a blade clamp mechanism for quickly and easily replacing and securing a saw blade to a spindle of a reciprocating saw.

Hand held reciprocating tools, such as electric reciprocating saws, include removable blades, which permit the use of different cutting edges as may be necessary for cutting different materials and for the replacement of worn or damaged blades. This requires a blade mounting system that allows rapid blade replacement while accurately and firmly coupling the blade to the tool. Typically, blade mounting systems require a tool, such as an Allen wrench or a special key, in order to replace and secure the blade, which is a slow and often difficult process.

SUMMARY

The invention provides a cutting tool clamp mechanism for a power tool. The cutting tool clamp mechanism includes a housing supported by a spindle, the spindle being configured to receive and drive a cutting tool along a longitudinal axis of the spindle. A clamping system is supported by the housing and includes an engaging portion movable relative to the spindle, the clamping system having an engaged condition, in which the engaging portion is engageable with the cutting tool to secure the cutting tool in the spindle, and a released condition, in which the engaging portion is disengageable with the cutting tool. A biasing member is positioned between the housing and the clamping system, and operable to bias the clamping system to the engaged condition. When the cutting tool is removed from the spindle, the clamping system is held in the released condition, and upon insertion of the cutting tool into the housing, the clamping system moves from the released condition to the engaged condition.

The invention provides a cutting tool clamp mechanism for a power tool. The cutting tool clamp mechanism includes a housing supported by a spindle, the spindle being configured to receive and drive a cutting tool along a longitudinal axis of the spindle. A clamping system is supported by the housing, the clamping system including an actuator portion movable relative to the spindle and an engaging portion configured to be moved by the actuator portion relative to the spindle. The clamping system has an engaged condition, in which the engaging portion is engageable with the cutting tool, and a released condition, in which the engaging portion is disengageable with the cutting tool. A biasing member is positioned between the housing and the clamping system, and operable to bias the clamping system to the engaged condition. An ejection system is positioned within the housing, the ejection system movable between an inserted condition and an ejected condition. When the clamping system is released from the engaged condition, the ejection system ejects the cutting tool from the housing and holds the clamping system in the released condition.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
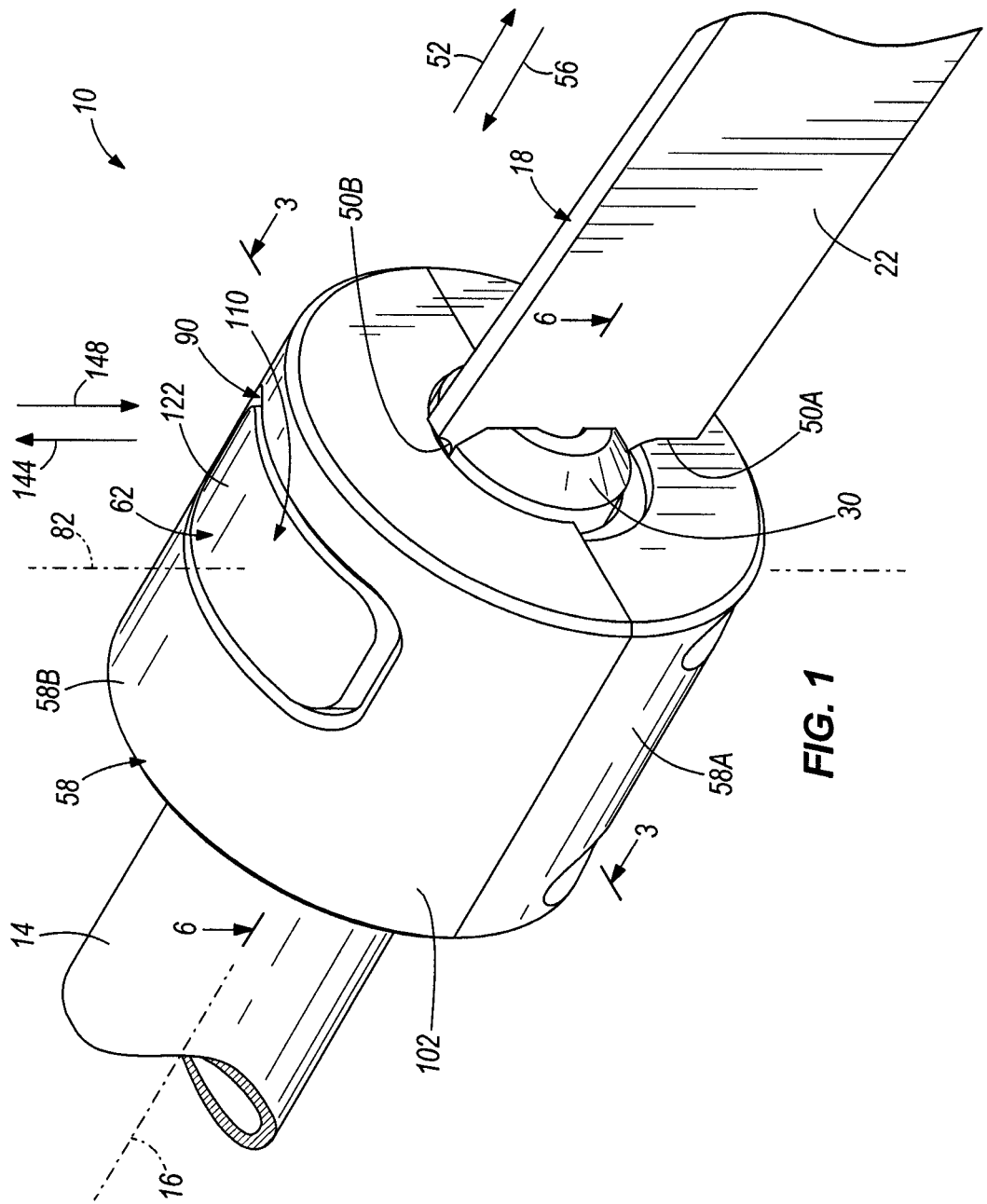
FIG. 1 is a perspective view of a blade clamp mechanism according to an embodiment of the invention.
Figure 2:
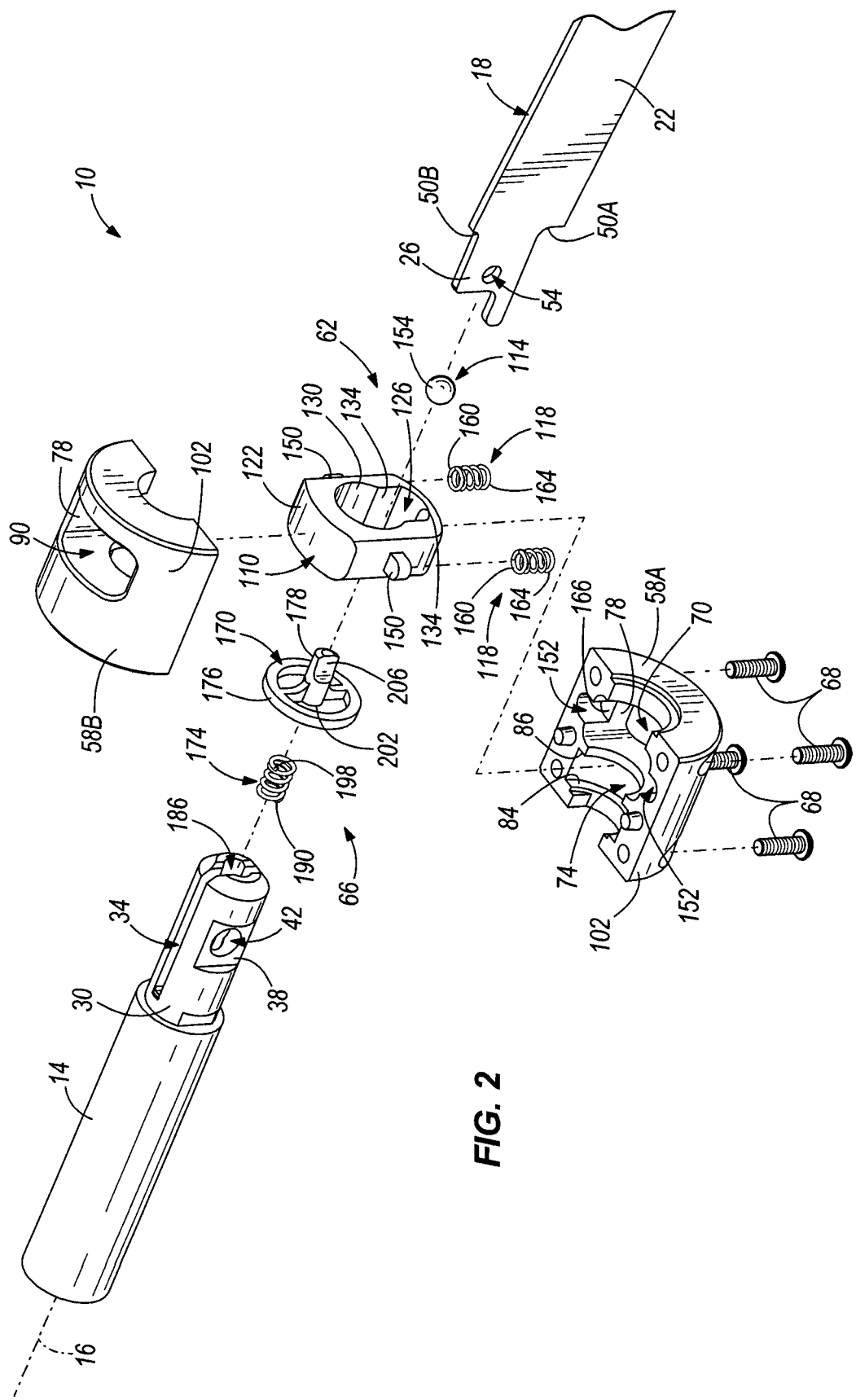
FIG. 2 is an assembly view of the blade clamp mechanism in FIG. 1.

FIGS. 1-8 illustrate a tool clamp mechanism 10 for a power tool according to one embodiment of the invention. With reference to FIG. 1, the tool clamp mechanism 10 is mounted on a spindle 14 of a reciprocating saw (not shown), and is shown engaging a tool 18 (e.g., a saw blade) having a main portion 22 and a tang 26 (FIGS. 2-4 and 6-8). In other embodiments, various reciprocating tools (e.g., saw blades) and/or rotating tools (e.g., drill bits) may be used with the blade clamp mechanism.

The spindle 14 is adapted to be mounted for reciprocation within a body of the reciprocating saw along a longitudinal axis 16 of the spindle 14. A drive portion (not shown) of the spindle 14 is adapted to be driven by a wobble plate or other mechanism (not shown), as is generally known in the art. The spindle 14 has an assembly seat 30 that includes an axially extending slot 34 (FIGS. 2 and 5-8) for receiving the tang 26 of the blade 18, two generally planar surfaces 38 on the exterior of the assembly seat 30, and an aperture 42 extending from one of the planar surfaces 38 to the slot 34.

The saw blade 18 includes two shoulder portions 50A, 50B (FIGS. 1 and 2) that form a transition from the tang 26 to the main portion 22. The saw blade 18 is able to be inserted into the spindle 14 in a first axial direction 52 and removed from the spindle 14 in a second axial direction 56 opposite of the first axial direction 52. When the tang 26 of the saw blade 18 is inserted into the slot 34, the shoulder portions 50A, 50B of the saw blade 18 engage the blade clamp mechanism 10 at two locations (FIG. 1). The blade 18 further includes an aperture 54 (FIGS. 2-4 and 6-8) to facilitate engagement of the blade 18 with the blade clamp mechanism 10.

The blade clamp mechanism 10 includes a housing 58 (FIG. 1), a clamping system 62 for engaging and disengaging the saw blade 18, and an ejection system 66 (FIGS. 2 and 6-8) for automatically ejecting the tool 18 from the blade clamp mechanism 10. The housing 58 of the blade clamp mechanism 10 is adaptable to the assembly seat 30 of the spindle 14 and guided by the planar surfaces 38 of the assembly seat 30. The housing 58 has two members 58A, 58B (i.e., a first member 58A and a second member 58B); however in other embodiments the housing 58 may be a single member or more than two members. In this embodiment, the two members 58A, 58B are generally mirror images of each other. The members 58A, 58B are located around the assembly seat 30 with the members 58A, 58B secured to one another by fasteners, such as bolts (not shown). In other embodiments, the members 58A, 58B may be secured by methods such as welding, clamping, snap rings and other fastening methods available to one skilled in the art.

The assembled members 58A, 58B (i.e., housing 58) includes two chambers: a first chamber 70 (FIGS. 2-5) for the clamping system 62 and a second chamber 74 (FIGS. 2 and 6-8) for the ejection system 66. The first chamber 70 is defined by transverse surfaces 78 for guiding the clamping system 62 along a first transverse axis 82, which is perpendicular to the longitudinal axis 16 of the spindle 14. In the illustrated embodiment, the second member 58B includes an aperture 90 for receiving the clamping system 62. The aperture 90 extends through the second member 58B from an exterior surface 102 of the housing 58 to the first chamber 70. In other embodiments, the aperture 90 extends through the first member 58A from the exterior surface 102 of the housing 58 to the first chamber 70. The clamping system 62 slides within and protrudes from the second member 58B in some positions. The second chamber 74 is defined by a first axial surface 84 and a second axial surface 86 opposite the first axial surface 84, whereby the ejection system 66 slides between the first and second axial surfaces 84, 86.

The clamping system 62 includes an actuator portion 110, an engaging portion 114 movable along a second transverse axis 116, which is perpendicular to the first transverse axis 82 and to the longitudinal axis 16, and two biasing members 118 for biasing the actuator portion 110. In the illustrated embodiment, the actuator portion 110 is a user-actuated button, the engaging portion 114 is a detent ball and the biasing members 118 are springs (e.g., compression springs). In other embodiments, the actuator portion 110 is any device that may be actuated by a user, a robot and/or other mechanical devices known in the art. The actuator portion 110 includes a hub or tab 122 and an area or receptacle 126, which has a generally keyhole shape that defines a cam surface 130 and two generally planar (cam) surfaces 134 (FIGS. 2-5). In the illustrated embodiment, the actuator portion 110 moves along the first transverse axis 82 in a first transverse direction 144 and a second transverse direction 148 opposite the first transverse direction 144. The actuator portion 110 engages and slides across the multiple transverse surfaces 78 of the first chamber 70 and the planar surfaces 38 of the spindle 14 to guide movement of the actuator portion 110 along the first transverse axis 82. The actuator portion 110 also includes a pair of flanges 150 for capturing and compressing the two biasing members 118. The flanges 150 of the actuator portion 110 reside within inner cavities 152 (FIGS. 2-6) of the housing 58.

The engaging portion 114 includes a cam surface 154 (i.e., a spherical-shaped cam surface) for releasably engaging the actuator portion 110 and an engaging end 158 (FIGS. 6-8) for sitting in the aperture 54 of the blade 18. The cam surface 154 of the engaging portion 114 is positioned proximate the cam surfaces 130, 134 of the actuator portion 110 and may have various shapes, such as curved as shown in this embodiment. The engaging end 158 of the engaging portion 114 slides within the aperture 42 of the assembly seat 30 along the second transverse axis 116 to releasably sit within the aperture 54 of the blade tang 26. The engaging portion 114 (i.e., the cam surface 154) slides against the cam surfaces 130, 134 when the engaging portion 114 is being removed from and inserted to the blade 18 such that the engaging end 158 disengages and engages with the blade 18.

Referring to FIGS. 2-5, each biasing member 118 includes a first leg 160 abutting the respective flange 150 and a second leg 164 positioned against a first wall 166 of the respective inner cavity 152. The flanges 150 are locked against a second wall 168 of the cavities 152 by a biasing force of the biasing members 118. The biasing members 118 are positioned to bias the engaging portion 114 of the clamping system 62 into the slot 34 to engage the blade 18.

The ejection system 66 includes an ejector 170, or plunger, and a biasing member 174 (e.g., a spring). Referring to FIGS. 2 and 6-8, the ejector 170 includes a collar or frame 176 and a hub 178. An axial channel 186 of the spindle 14 intersects the slot 34 of the spindle 14 and receives the biasing member 174 and the hub 178. The biasing member 174 resides in the channel 186 having a first leg 190 abutting a wall 194 (FIGS. 6-8) of the spindle 14 and a second leg 198 abutting a surface 202 of the hub 178. The biasing member 174 is positioned to bias the ejector 170 towards the blade 18 to eject the blade 18 from the slot 34 of the spindle 14 and therein the housing 58. The frame 176 of the ejector 170 employs the second chamber 74 around the assembly seat 30, such that the frame 176 moves axially, along the longitudinal axis 16 and between the axial surfaces 84, 86, for engagement and disengagement with the blade 18.

The blade clamp mechanism 10 generally has three conditions: an engaged condition, a released condition and a no-blade condition. In the engaged condition (FIGS. 3 and 6), the saw blade 18 is secured to the spindle 14 for synchronized movement therewith. The biasing member 118 biases the actuator portion 110 in the second transverse direction 148 such that cam surface 134 of the actuator portion 110 forces the engaging portion 114 toward the slot 34 to engage and secure the blade 18 with the spindle 14. The tab 122 of the actuator portion 110 (FIGS. 1 and 3) extends from the housing 58 and is accessible by a user.

In the released condition (FIGS. 4 and 7), the blade 18 is disengaged from the spindle 14 to allow removal of the blade 18 from the blade clamp mechanism 10. The actuator portion 110 is pushed into the housing 58 (FIG. 4), against the biasing force of the biasing members 118 to compress the biasing members 118 and remove the engaging portion 114 from the blade 18.

In the no-blade condition (FIGS. 5 and 8), the saw blade 18 is removed from the spindle 14 and the housing 58, and the engaging portion 114 engages the ejector 170. The clamping system 62 is held in the released condition by the ejector 170 when the blade 18 is removed from the blade clamp mechanism 10.

The ejection system 66 generally has two conditions: an inserted or compressed condition and an ejected condition. In the inserted condition (FIGS. 3 and 6), the blade 18 is engaged with the spindle 14 via the engaging portion 114. The ejection system 66 is held in the inserted condition, against the biasing force of the biasing member 174, by engagement of the clamping system 62 and the blade 18. In the ejected condition (FIGS. 5 and 8), the clamping system 62 is in the released condition to release the blade 18, and the ejection system 66 ejects the blade 18 from the blade clamp mechanism 10. The ejection system 66 is biased into the ejected condition by the biasing member 174, because the clamping system 62 no longer holds the blade 18 in position, and the ejection system 66 holds the clamping system 62 (i.e., the engaging portion 114) in the released condition. In the ejected condition, the ejector 170 locks or prevents the engaging portion 114 from entering the slot 34.

Figure 3:
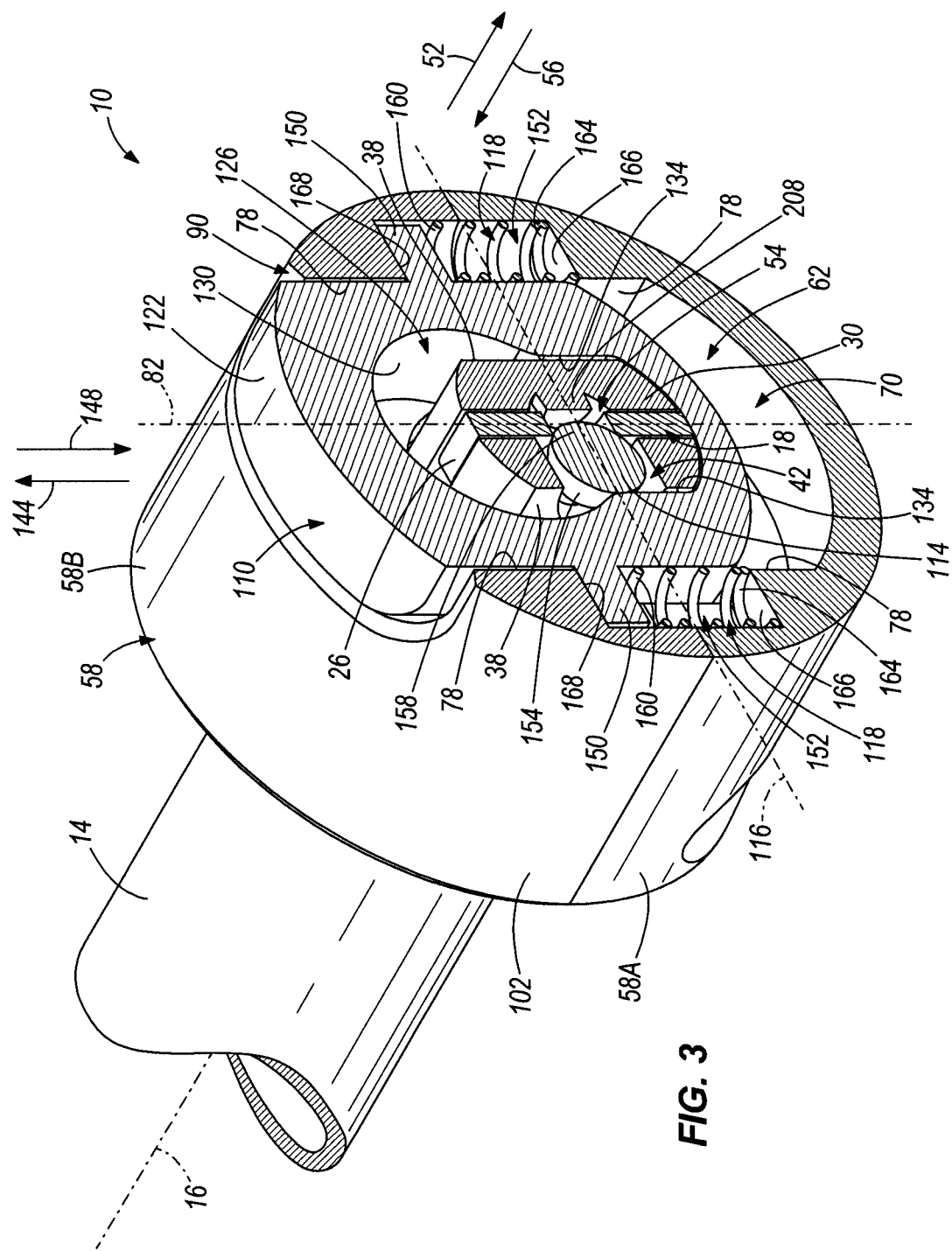
FIG. 3 is a sectional view of the blade clamp mechanism taken along line 3-3 in FIG. 1, and showing the blade clamp mechanism in an engaged condition.
Figure 4:
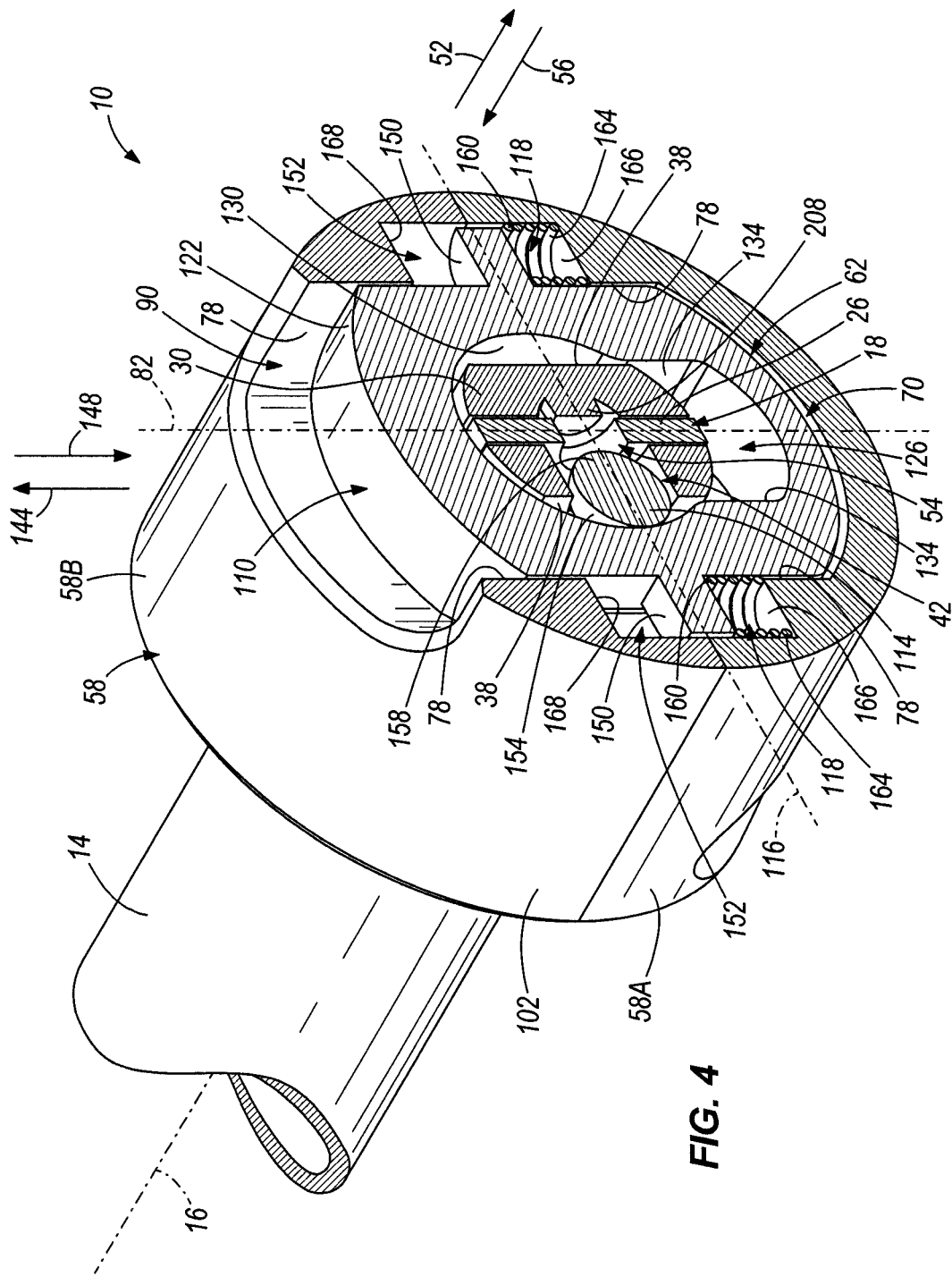
FIG. 4 is a sectional view of the blade clamp mechanism showing the blade clamp mechanism in a released condition.
Figure 6:
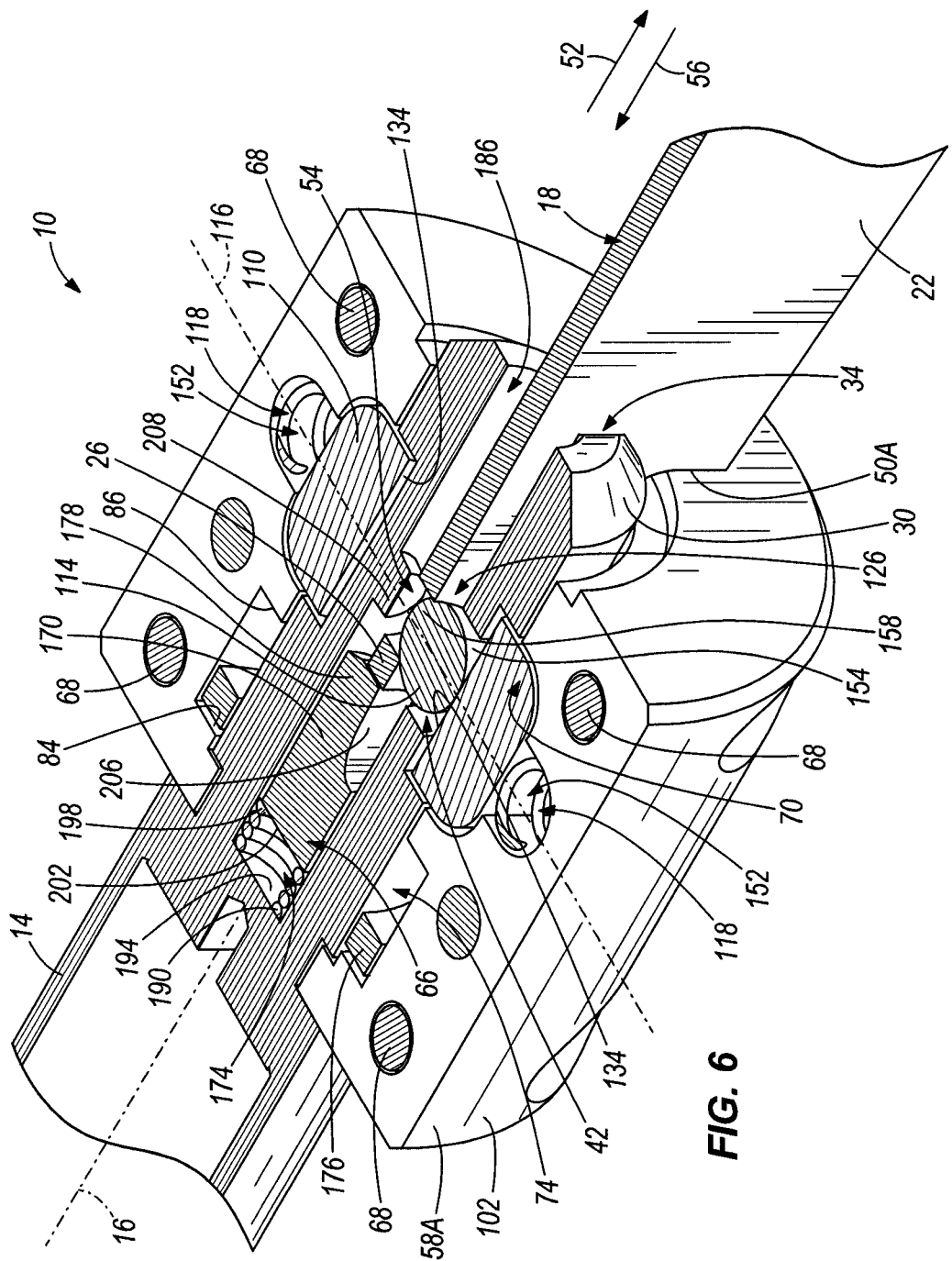
FIG. 6 is a sectional view of the blade clamp mechanism taken along line 6-6 in FIG. 1, and showing the blade clamp mechanism in the engaged condition.
Figure 7:
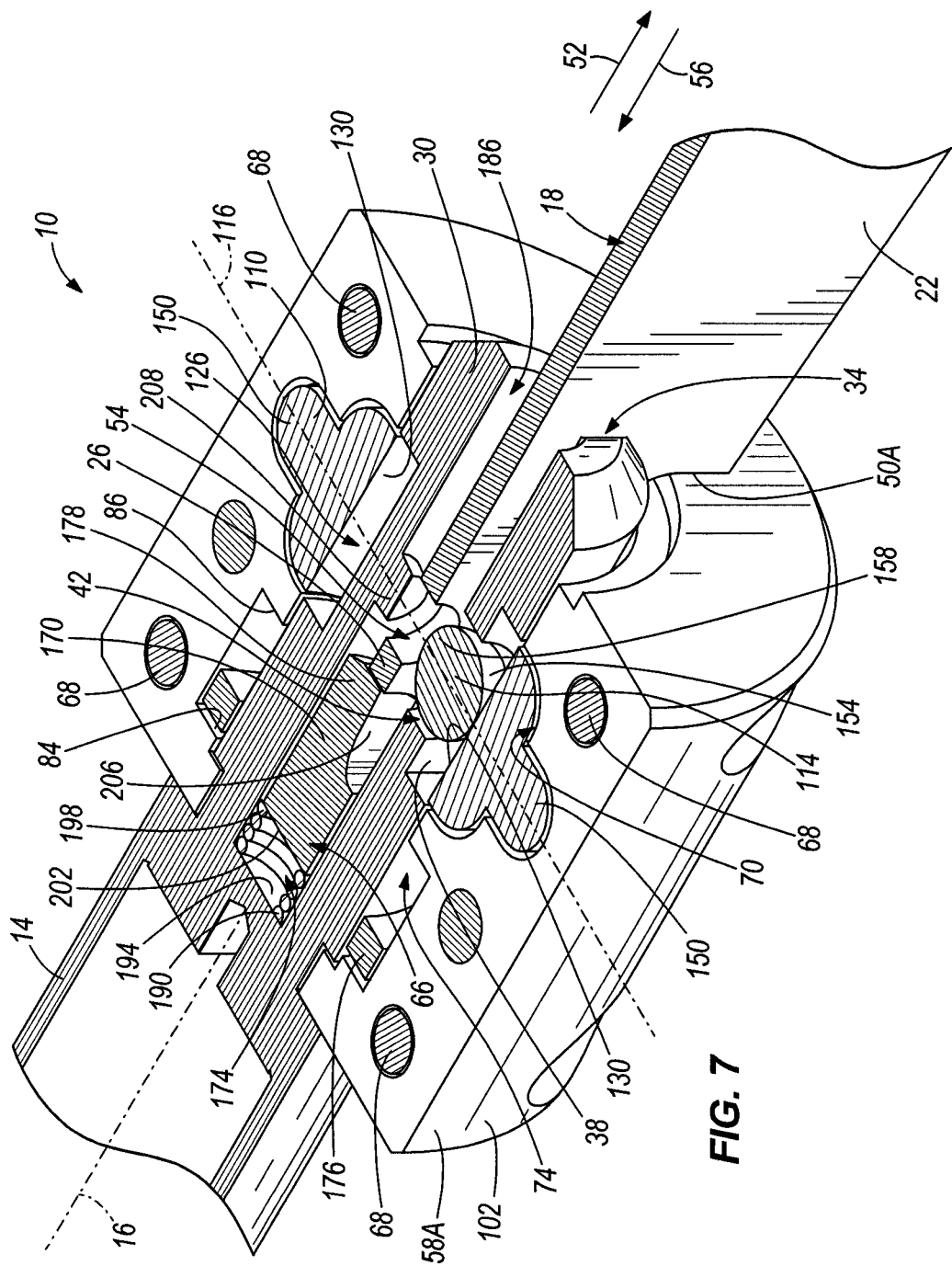
FIG. 7 is a sectional view of the blade clamp mechanism showing the blade clamp mechanism in the released condition.

FIGS. 3 and 6 illustrate the blade clamp mechanism 10 in the engaged condition. To release or remove the blade 18 from the spindle 14 of the blade clamp mechanism 10, force is applied (generally by a user) to the tab 122 of the clamping system 62 in the first transverse direction 144. The force compresses the biasing members 118 seated in the cavities 152 of the housing 58 and moves the actuator portion 110 in the first transverse direction 144 (i.e., the direction of the user applied force) relative to the housing 58 and the spindle 14. The actuator portion 110 moves from the engaged condition (FIGS. 3 and 6) toward the released condition (FIGS. 4 and 7). Movement of the actuator portion 110 along the first transverse axis 82 causes the cam surface 154 of the engaging portion 114 to engage and slide against the cam surface 130 of the actuator portion 110, which allows the engaging portion 114 to slide out of the blade aperture 54 along the second transverse axis 116, and thereby disengage the engaging portion 114 from the blade 18. Movement of the actuator portion 110 also disengages the planar surfaces 134 of the receptacle 126 from the planar surfaces 46 of the assembly seat 30, which may be a partial disengagement or an entire separation.

Figure 5:
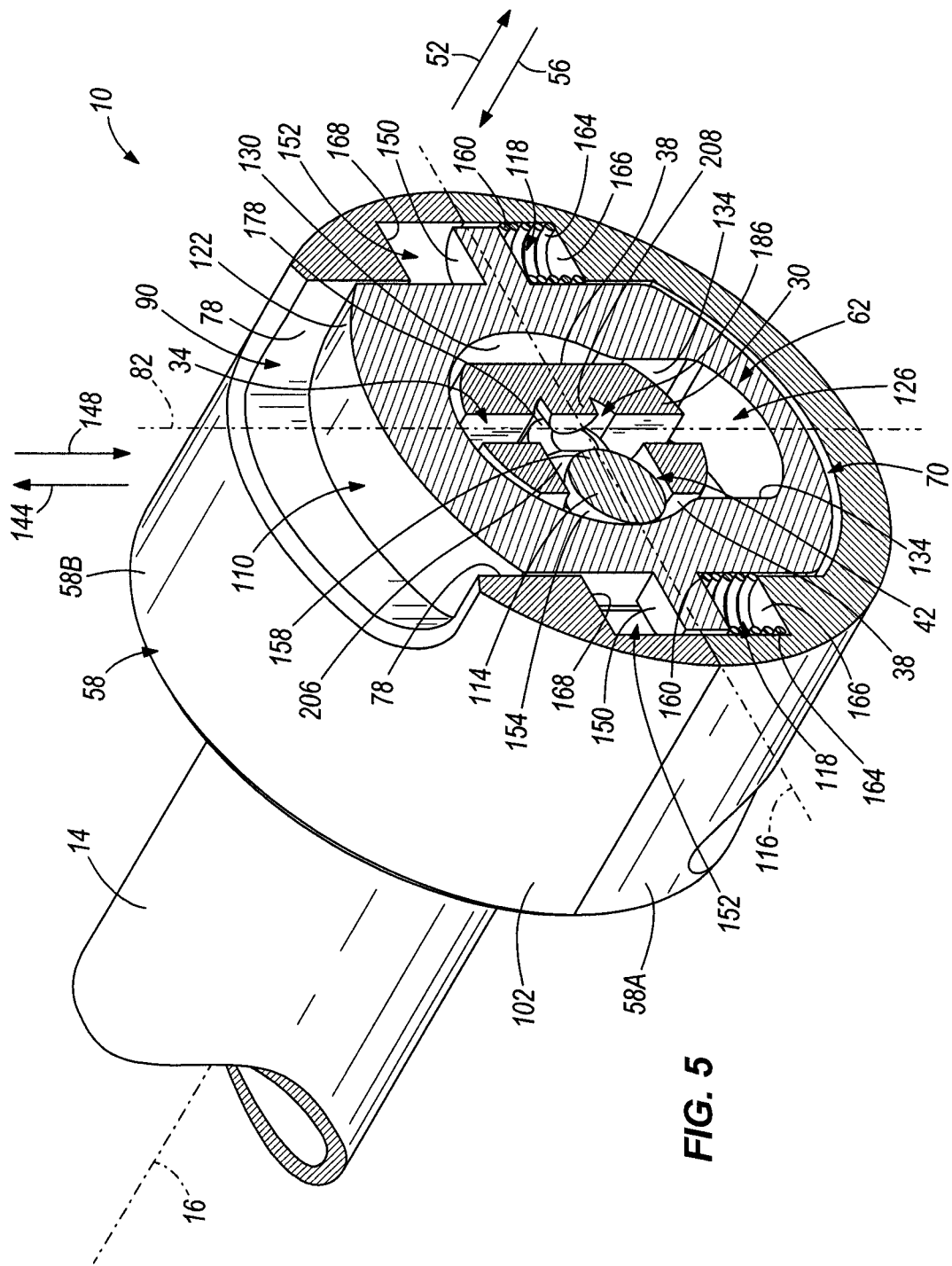
FIG. 5 is a sectional view of the blade clamp mechanism showing the blade clamp mechanism in a no-blade condition.
Figure 8:
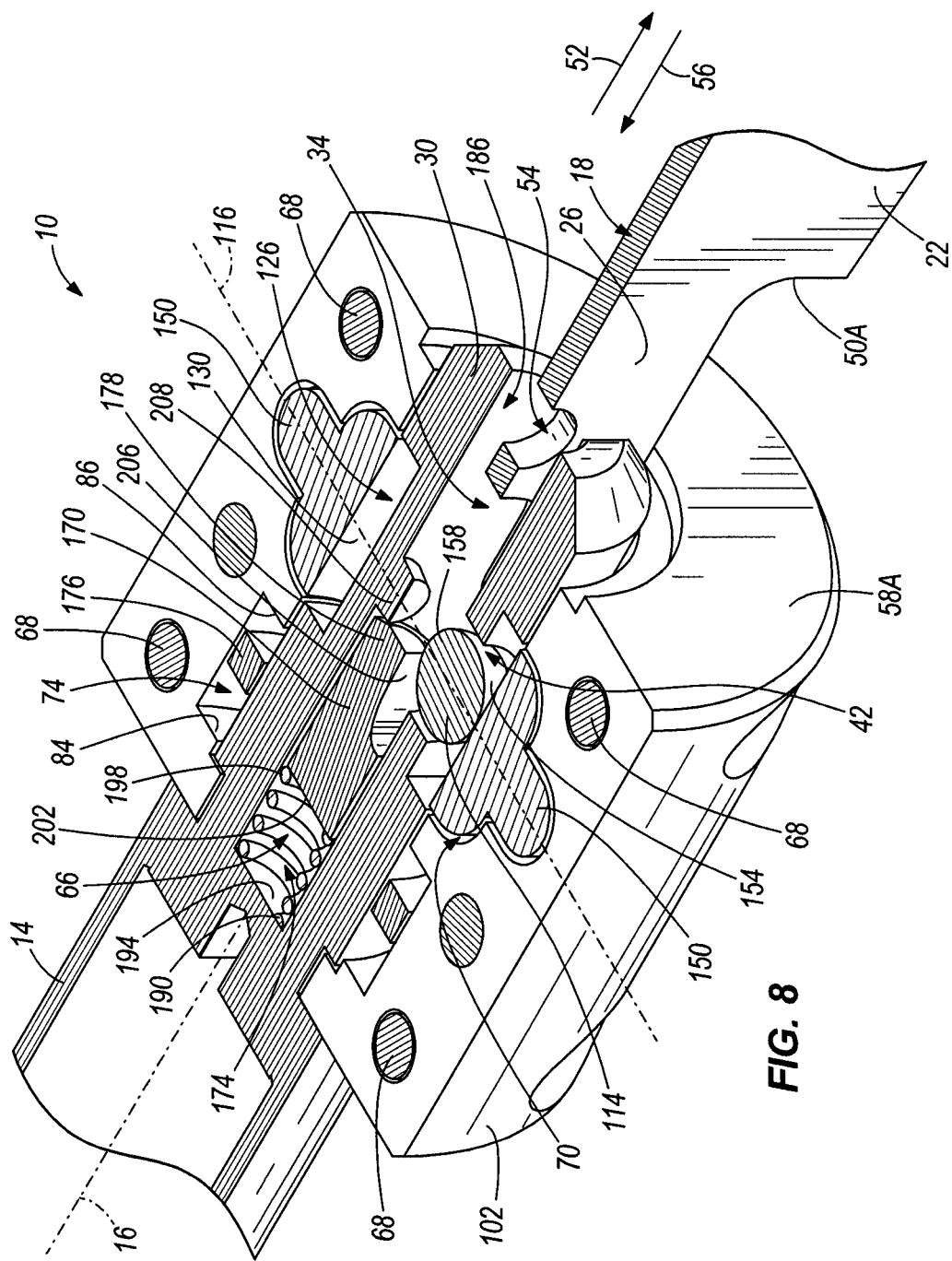
FIG. 8 is a sectional view of the blade clamp mechanism showing the blade clamp mechanism in the no-blade condition.

With the engaging portion 114 disengaged from the saw blade 18 (FIGS. 4 and 7), the biasing member 174 biases the ejector 170 from the inserted condition (FIGS. 3 and 6) toward the ejected condition (FIGS. 5 and 8). The hub 178 of the ejector 170, which is abutting the tang 26 of the blade 18, slides in the second axial direction 56 through the channel 186 of the assembly seat 30, thereby pushing the blade 18 in the second axial direction 56. The force of the biasing member 174 forces the blade in the second axial direction 56, which causes the engaging portion 114 to slide out of the aperture 42 as permitted by the cam surface 130 of the actuator portion 110. The blade 18 slides out of the slot 34 via the hub 178 of the ejector 170. As the blade 18 ejects from the spindle 14, the engaging portion 114 slides across the tang 26 of the blade 18 (in the absence of the blade aperture 54) and because the biasing members 118 force the actuator portion 110 to the engaged condition, the engaging portion 114 engages a locking surface 206 (shown in FIGS. 5 and 8) of hub 178.

At this point, the ejection system 66 is in the ejected condition and the blade clamp mechanism 10 is in the no-blade condition (FIGS. 5 and 8). The biasing member 174 of the ejection system 66 forces the frame 176 to slide axially through the second chamber 74 and locks the hub 178 against a stop 208 of the assembly seat 30 protruding into the axial channel 186. The stop 208 is positioned in the axial channel 186 (FIG. 5) and limits the travel of the ejector 170 through the axial channel 186, but does not extend into the slot 34 that receives the blade 18. The hub 178 rests across the spindle aperture 42, taking the place of the tang 26 of the blade 18 and prevents the engaging portion 114 from passing through the slot 34. The engaging portion 114 is locked against the locking surface 206 of the ejector 170, against the biasing force of the biasing members 118, which causes the clamping system 62 to be held in the released condition (FIGS. 5 and 8). Thus, the biasing members 118 (FIG. 5) are held or compressed against the biasing force due to the engagement of the hub 178 and the engaging portion 114.

To insert the blade 18 into the spindle 14, the tang 26 is pushed against the hub 178 of the ejection system 66, which compresses and opposes the biasing force of the biasing member 174. As the hub 178 is pushed axially toward the biasing member 174, the biasing members 118 of the clamping system 62 (shown in FIGS. 3-6) bias the actuator portion 110 and the engaging portion 114 in the second transverse direction 148. The engaging portion 114 slides across the locking surface 206 of the ejector hub 178 and then the tang 26 until the aperture 54 of the tang 26 aligns with the engaging portion 114. The alignment of the tang aperture 54 and the engaging portion 114 permits the engaging portion 114 to engage the blade 18 (the engaged condition shown in FIGS. 3 and 6). One of the planar surfaces 134 of the actuator portion 110 engages the cam surface 154 of the engaging portion 114, and the force of the biasing members 118 causes the engaging portion 114 to automatically sit in the aperture 54 of the tang 26, locking the blade 18 into the blade clamp mechanism 10. The biasing members 118 move the actuator portion 110 in the second transverse direction 148 to return the actuator portion 110 to the engaged condition (FIGS. 1, 3 and 6) and ready the power tool for use. As shown in FIG. 7, the ejector 170 is locked in the channel 186 of the assembly seat 30 between the tang 26 and the biasing member 174 (i.e., in the inserted condition) to restrain the biasing force of the biasing member 174.

Although the invention has been described in detail with reference to certain preferred embodiments, variations and modifications exist within the scope and spirit of one or more independent aspects of the invention as described.

What is claimed is:

1. A cutting tool clamp mechanism for a power tool, the cutting tool clamp mechanism comprising:
    a housing supported by a spindle, the spindle being configured to receive and drive a cutting tool along a longitudinal axis of the spindle;
    a clamping system supported by the housing and including an engaging portion movable relative to the spindle, the clamping system having an engaged condition, in which the engaging portion is engageable with the cutting tool to secure the cutting tool in the spindle, and a released condition, in which the engaging portion is disengageable with the cutting tool; and
    a biasing member positioned between the housing and the clamping system, and operable to bias the clamping system to the engaged condition,
    wherein when the cutting tool is removed from the spindle, the clamping system is held in the released condition, and upon insertion of the cutting tool into the housing, the clamping system moves from the released condition to the engaged condition;
    wherein the clamping system includes an actuator portion movable relative to the spindle and configured for moving the engaging portion relative to the spindle;
    wherein the actuator portion surrounds a portion of the spindle and is movable along a first axis substantially perpendicular to the longitudinal axis to move the engaging portion along a second axis substantially perpendicular to the first axis;
    wherein an ejection system includes an ejector member that contacts the engaging portion of the clamping system to hold the clamping system in the released condition.

2. The cutting tool clamp mechanism of claim 1, wherein the engaging portion is a detent ball.

3. The cutting tool clamp mechanism of claim 1, wherein the engaging portion is configured to sit in an aperture of the cutting tool to secure the cutting tool to the spindle.

4. The cutting tool clamp mechanism of claim 1, wherein the biasing member is a compression spring.

5. The cutting tool clamp mechanism of claim 1 wherein the ejection system is movable between an inserted condition and an ejected condition, in which the ejection system is configured to eject the cutting tool from the housing when the clamping system is in the released condition.

6. The cutting tool clamp mechanism of claim 5, wherein when the ejection system is in the ejected condition, the ejection system holds the clamping system in the released condition.

7. The cutting tool clamp mechanism of claim 5, wherein the ejection system includes a second biasing member for biasing the ejector member to the ejected condition.

8. The cutting tool clamp mechanism of claim 7 and further comprising a stop extending from the spindle to engage the ejector member and hold the ejection system in the ejected condition.

9. The cutting tool clamp mechanism of claim 1, wherein the actuator portion is configured to overcome the bias of the biasing member to move the clamping system to the released condition.

10. The cutting tool clamp mechanism of claim 1, wherein the actuator portion extends from the housing.

11. The cutting tool clamp mechanism of claim 1, wherein the actuator portion is positioned around a portion of the spindle and reciprocates with the spindle.

12. The cutting tool clamp mechanism of claim 1, wherein the actuator portion includes a first cam surface and a second cam surface, the engaging portion configured to rest against the first cam surface in the engaged condition and against the second cam surface in the released condition.

13. A cutting tool clamp mechanism for a power tool, the cutting tool clamp mechanism comprising:
   a housing supported by a spindle, the spindle being configured to receive and drive a cutting tool along a longitudinal axis of the spindle;
   a clamping system supported by the housing, the clamping system including an actuator portion movable relative to the spindle and an engaging portion configured to be moved by the actuator portion relative to the spindle, the clamping system having an engaged condition, in which the engaging portion is engageable with the cutting tool, and a released condition, in which the engaging portion is disengageable with the cutting tool;
   a biasing member positioned between the housing and the clamping system, and operable to bias the clamping system to the engaged condition; and
   an ejection system positioned within the housing, the ejection system movable between an inserted condition and an ejected condition, wherein when the clamping system is released from the engaged condition, the ejection system ejects the cutting tool from the housing and a portion of the ejection system contacts the engaging portion to hold the clamping system in the released condition;
   wherein the actuator moves along an axis that is perpendicular to the longitudinal axis.

14. The cutting tool clamp mechanism of claim 13, wherein the engaging portion is a detent ball.

15. The cutting tool clamp mechanism of claim 13, wherein the engaging portion is configured to sit in an aperture of the cutting tool to secure the cutting tool to the spindle.

16. The cutting tool clamp mechanism of claim 13, wherein the actuator portion is configured to overcome the bias of the biasing member to move the clamping system to the released condition.

17. The cutting tool clamp mechanism of claim 13, wherein the actuator portion includes a first cam surface and a second cam surface, the engaging portion configured to rest against the first cam surface in the engaged condition and against the second cam surface in the released condition.

18. The cutting tool clamp mechanism of claim 13, wherein the actuator portion is movable along a first axis substantially perpendicular to the longitudinal axis to move the engaging portion along a second axis substantially perpendicular to the first axis.

19. The cutting tool clamp mechanism of claim 13, wherein upon insertion of the cutting tool into the housing, the clamping system moves from the released condition to the engaged condition.

20. The cutting tool clamp mechanism of claim 13, wherein the ejection system is movable along the longitudinal axis of the spindle.

21. The cutting tool clamp mechanism of claim 13, wherein the ejection system includes an ejector member and a second biasing member for biasing the ejector member to the ejected condition.

22. The cutting tool clamp mechanism of claim 21, wherein the ejector member engages the engaging portion of the clamping system to hold the clamping system in the released condition.

23. The cutting tool clamp mechanism of claim 21 and further comprising a stop extending from the spindle to engage the ejector member and hold the ejection system in the ejected condition.

24. The cutting tool clamp mechanism of claim 21, wherein the ejector member is moved by the cutting tool to overcome the bias of the second biasing member to move the ejection system to the inserted condition.

25. A cutting tool clamp mechanism for a power tool including a spindle having a longitudinal axis and a slot configured to receive a cutting tool, the spindle configured to drive the cutting tool along the longitudinal axis, the cutting tool clamp mechanism comprising:
   a housing supported by the spindle; and
   a clamping system supported by the housing, the clamping system including
      an engaging portion movable relative to the spindle,
      an actuator portion surrounding a portion of the spindle and movable along a first axis substantially perpendicular to the longitudinal axis to move the engaging portion along a second axis substantially perpendicular to the first axis, the actuator portion movable between an engaged condition, in which the engaging portion is configured to engage with the cutting tool to secure the cutting tool in the spindle, and a released condition, in which the engaging portion is configured to disengage with the cutting tool,
      a first biasing member and a second biasing member disposed on opposite sides of the blade slot for biasing the actuator portion, the first and second biasing members being positioned to bias the engaging portion of the clamping system to the engaged position.

26. The cutting tool clamp mechanism of claim 25, wherein the actuator portion includes a first flange and a second flange, the first biasing member positioned between the first flange and the housing and the second biasing member positioned between the second flange and the housing.

27. The cutting tool clamp mechanism of claim 25, wherein the actuator includes a first cam surface on a first side of the blade slot and a second cam surface on an opposite side of the blade slot from the first side, the first and second cam surfaces guiding movement of the actuator portion between the engaged condition and the released condition.

28. The cutting tool clamp mechanism of claim 1, wherein the actuator portion includes a first flange and a second flange, the first flange and the second flange being disposed on opposite sides of the spindle.

29. The cutting tool clamp mechanism of claim 13, wherein the actuator portion includes a first flange and a second flange, the first flange and the second flange being disposed on opposite sides of the spindle.

* * * * *